(12) United States Patent
Bantoft et al.

(10) Patent No.: US 10,999,378 B2
(45) Date of Patent: May 4, 2021

(54) SYSTEM AND METHOD PROVIDING IMPROVED, DUAL-PURPOSE KEEP-ALIVE PACKETS WITH OPERATIONAL DATA

(71) Applicant: Satcom Direct, Inc., Melbourne, FL (US)

(72) Inventors: Ken Bantoft, Oakville (CA); Adam Wayte, Carleton Place (CA)

(73) Assignee: Satcom Direct, Inc., Melbourne, FL (US)

(*) Notice: Subject to any disclaimer, the term of this patent is extended or adjusted under 35 U.S.C. 154(b) by 0 days.

(21) Appl. No.: 16/141,126

(22) Filed: Sep. 25, 2018

(65) Prior Publication Data

US 2019/0098094 A1 Mar. 28, 2019

Related U.S. Application Data (60) Provisional application No. 62/563,360, filed on Sep. 26, 2017.

(51) Int. Cl.
*H04L 29/08* (2006.01)
*H04B 7/185* (2006.01)
*H04L 12/26* (2006.01)

(52) U.S. Cl.
CPC ....... *H04L 67/145* (2013.01); *H04B 7/18508* (2013.01); *H04L 43/0811* (2013.01);
(Continued)

(58) Field of Classification Search
CPC ..... H04L 67/12; H04L 67/145; H04L 69/321; H04L 43/0811; H04L 43/10; H04B 7/18508
(Continued)

(56) References Cited

U.S. PATENT DOCUMENTS

| 6,304,546 B1 | 10/2001 | Natarajan et al. |
| 8,326,985 B2 | 2/2012 | Luna et al. |

(Continued)

FOREIGN PATENT DOCUMENTS

| EP | 1162808 B1 * | 1/2001 | ............. H04L 29/06 |
| WO | WO-2018226154 A1 * | 12/2018 | ........... B64C 39/024 |

OTHER PUBLICATIONS

Transmittal; International Search Report; and Written Opinion of the International Searching Authority for International Application No. PCT/US2018/052612 dated Dec. 19, 2018.

*Primary Examiner* — James E Springer
(74) *Attorney, Agent, or Firm* — Lowndes; Stephen C. Thomas; Sean S. Wooden (57) ABSTRACT

Systems and methods for combining operational data transmission (statistics about device health, connected device information, and the like) and keep alive packets (ping type packets which expect a reply back within predetermined amount of time to indicate network connections can pass traffic bi-directionally) are described. Embodiments provide an onboard aircraft communication equipment, in which the onboard aircraft communication equipment is deployed on an operational aircraft and transmits keep-alive packets to a ground network. Embodiments generate operational data from the aircraft, construct a bi-directional keep-alive packet with keep-alive data for transmission between the onboard aircraft communication equipment and the ground network, combine the operational data with the bi-directional keep-alive packet into a combined keep-alive request transmission, and transmit the combined keep-alive request transmission from the onboard aircraft communication equipment to the ground network.

20 Claims, 4 Drawing Sheets

(52) U.S. Cl.
 CPC .............. *H04L 43/10* (2013.01); *H04L 67/12* (2013.01); *H04L 69/321* (2013.01)
(58) Field of Classification Search
 USPC ........................................................ 709/228
 See application file for complete search history.

(56) References Cited

U.S. PATENT DOCUMENTS

| | | | |
|---|---|---|---|
| 9,143,428 B1 | 9/2015 | Jintaseranee et al. | |
| 9,553,658 B1 | 1/2017 | Bantoft et al. | |
| 9,900,082 B1* | 2/2018 | Chowdhury | H04L 41/0806 |
| 2005/0233739 A1* | 10/2005 | Forbes | G07C 5/008 |
| | | | 455/431 |
| 2009/0254960 A1* | 10/2009 | Yarom | H04L 29/06027 |
| | | | 725/115 |
| 2013/0034005 A1* | 2/2013 | Xhafa | H04W 76/10 |
| | | | 370/252 |
| 2014/0075506 A1* | 3/2014 | Davis | H04L 67/12 |
| | | | 726/3 |

* cited by examiner

SYSTEM AND METHOD PROVIDING IMPROVED, DUAL-PURPOSE KEEP-ALIVE PACKETS WITH OPERATIONAL DATA

RELATED APPLICATIONS

This application claims priority from U.S. Provisional Patent Application No. 62/563,360, filed Sep. 26, 2017, the contents of which are incorporated herein in their entirety by reference.

FIELD

Embodiments described herein relate to operational and network status checking, and in particular to systems, devices, and methods for combining operational data transmission (e.g., statistics about device health, connected device information, event data, and the like) and keep-alive packets (e.g., ping type packets which expect a reply back within predetermined amount of time to indicate network connections can pass traffic bi-directionally).

BACKGROUND

Keep-alive messages or packets are typically "ping" type packets where one end transmits the message and expects a reply back within a predetermined length of time, which confirms the network can pass traffic bi-directionally. See for example, U.S. Pat. No. 6,304,546 to Natarajan and U.S. Pat. No. 8,326,985 to Luna et al.

Sending operational data and keep-alive messages requires multiple streams/sessions; i.e., separate streams/sessions for operational data and for the keep-alive messages. In normal terrestrial networks, there is plenty of bandwidth, so having multiple streams/sessions is not a problem. In air-ground networks, however, bandwidth is substantially more limited and having multiple streams/sessions can be a problem The prior art is generally focused on the use of proxy keep-alives, for transparently monitoring network links, or keep-alives as a specific protocol (i.e., IPSEC, NAT), and generally requires the use of proxies or handle a specific protocol. That is, the keep-alive messages are specific to a protocol or implementation of a protocol, and used for the single purpose only In low bandwidth situations, an ideal solution is to repurpose the keep-alive messages to serve multiple purposes.

SUMMARY

Embodiments provide systems, devices, and methods that combine operational data transmission (e.g., statistics about device health, connected device information, and the like) and keep-alive packets (e.g., ping type packets which expect a reply back within predetermined amount of time to indicate network connections can pass traffic bi-directionally). Unlike the prior art, embodiments are not specific to a protocol or application, and can be used by the system as a transport method for operational data. Embodiments do not require the use of proxies or handle a specific protocol in transmitting keep-alive packages. Embodiments achieve greater operational efficiency by creating and utilizing dual-purpose keep-alive messages. Embodiments, therefore, overcome the disadvantages of the prior art.

These and other advantages may be provided, for example, by method of combining operational data transmission and keep-alive packets. The method provides an onboard aircraft communication equipment, in which the onboard aircraft communication equipment is deployed on an operational aircraft and transmits keep-alive packets to a ground network. The method may also provide a ground network for communicating with onboard aircraft communication equipment. The method may generate operational data from the aircraft, construct a bi-directional keep-alive packet with keep-alive data for transmission between the onboard aircraft communication equipment and the ground network, combine the operational data with the bi-directional keep-alive packet into a combined keep-alive request transmission, and transmit the combined keep-alive request transmission from the onboard aircraft communication equipment to the ground network. In embodiments, the method may also receive the combined keep-alive request transmission at the ground network, process the operation data in the keep-alive request transmission, construct a bi-directional keep-alive response packet, combine ground network operational data with the bi-directional keep-alive response packet into a combined keep-alive response transmission, and transmit the combined keep-alive response transmission from the ground network to the onboard aircraft communication equipment.

The advantages described above and others may also be provided, for example, by a system for combining operational data transmission and keep-alive packets. The systems include onboard aircraft communication equipment. The onboard aircraft communication equipment is deployed on an operational aircraft and transmits keep-alive packets to a ground network. The onboard aircraft communication equipment includes onboard gateway equipment and an onboard aircraft router. The onboard aircraft router includes a processor and a memory, the memory including instructions for execution by the processor to generate operational data from the aircraft, construct a bi-directional keep-alive packet with keep-alive data for transmission between the onboard aircraft communication equipment and the ground network, combine the operational data with the bi-directional keep-alive packet into a combined keep-alive request transmission, and transmit the combined keep-alive request transmission from the onboard aircraft communication equipment to a ground network In embodiments, the system may include a ground network for receiving the combined keep-alive request transmission. The ground network includes a first virtual node to send an immediate keep-alive response to the requesting aircraft, a second virtual node to process the operational data retrieved from each combined keep-alive request transmission, and a third virtual node to store the data access by other integrated applications and technical personnel.

BRIEF DESCRIPTION OF THE FIGURES

The drawing included herein depict one or more implementations in accord with the present concepts, by way of example only, not by way of limitations. In the figures, like reference numerals refer to the same or similar elements.

DETAILED DESCRIPTION

Embodiments provide systems, devices, and methods that combine operational data transmission (e.g., statistics about device health, connected device information, event data, and the like) and keep-alive packets (e.g., ping type packets which expect a reply back within predetermined amount of time to indicate network connections can pass traffic bi-directionally). Embodiments, therefore, overcome the disadvantages of the prior art. Embodiments allow a service provider, or equipment owner to reduce the amount of data transmitted for operational and network status checking into a single data stream. The server of a keep-alive endpoint must also be capable of processing or forwarding the operational data on to another system, as the payload would be tightly coupled to the keep-alive data stream.

Unlike the prior art, embodiments do not require the use of proxies or handle a specific protocol in transmitting keep-alive packages. Further objects and advantages of this invention will be apparent from the following detailed description of the presently preferred embodiments which are illustrated schematically in the accompanying drawings.

Before explaining the disclosed embodiments in detail it is to be understood that the invention is not limited in its applications to the details of the particular arrangements shown since the invention is capable of other embodiments. Also, the terminology used herein is for the purpose of description and not of limitation.

In the Summary above and in the Detailed Description and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of definitions is now described.
Layers, in the TCP/IP and OSI Model:
Physical
Datalink/MAC
Network
Transport
Session
Presentation
Application Health Data is typically status of communication links (e.g., up/down, latency, throughput, reliability, packet loss, etc.).

Connected Device information is MAC address, IP address, device time, connection type (WiFi vs. Wired), amount of data used, duration connected, username (if available), and similar data.

Event data is typically either related to the system itself, or a connected system, and may contain details of a specific event or series of events, like connection up/down, authentication success or failure, subsystem status changes, and similar data.

Keep-alives are defined as information sent to which a response is needed in order to confirm a communications link or system is still responding—'Are you there?' with an expected response of 'Yes'. Keep-alive message are ping-type packets which expect a reply back within predetermined amount of time to indicate network connections that will pass traffic bi-directionally In normal terrestrial networks, there is plenty of bandwidth, so having multiple streams/sessions is not a problem. As well, the keep alive process is normally done at the network/transport layer of the TCP/IP and OSI model—layers 3+4. Operational data, on the other hand, is application related, so it is normally communicated at layers 6+7 of the TCP/IP and OSI models. Embodiments described herein collapse layers 4–7, by taking the application layer data and directly placing the application layer data into the payload of the keep-alive packets, which operate at OSI layer 4 (Transport). This eliminates the overhead of multiple layers for the operational data.

Typically, the vendor and technology of a keep-alive system is unrelated to that of the operational health check system. Consequently, the two systems are totally separate, not sharing any information, technology, or toolchain. Embodiments merge these two systems, providing significant advantages of a single system that provides data about reachability as well as operational heath of the networks and hardware.

Figure 1:
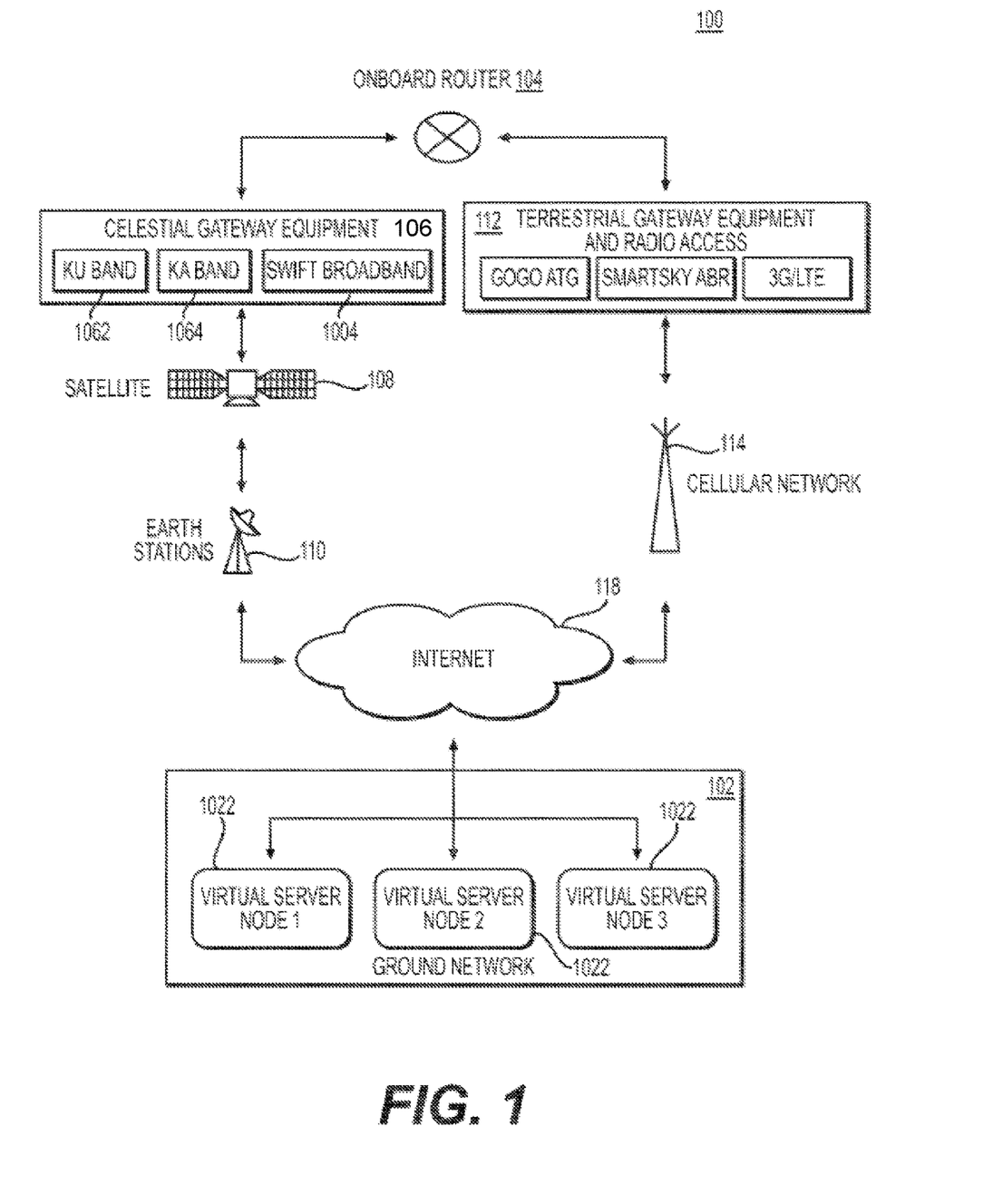
FIG. 1 illustrates an overview of an embodiment of a network between a direct ground network and an onboard aircraft direct router that may transmit combined operational data and keep-alive packets.

With reference now to FIG. 1, shown is an embodiment of a network system 100 for combining network operational data and keep-alive packets. FIG. 1 illustrates a topology overview showing a ground network 102 (e.g., a Satcom Direct Ground Network) and an onboard aircraft router 104 (e.g., a Satcom Direct Router ("SDR")).

Onboard aircraft router 104 is a connectivity platform, e.g., an aviation connectivity platform, that may run an application that utilizes an end-to-end bi-directional keep-alive (a keep-alive message) using virtual circuits. The function of the bi-directional keep-alive is to determine the current run state of all celestial and terrestrial WAN interfaces and to relay operational data to the ground simultaneously. Onboard aircraft router 104 may include a processor and memory including instructions therein that are executed by the processor for performing the operations, methods and processes described herein. For example, onboard aircraft router 104 may run a client that performs methods and processes described herein, transmitting keep-alive requests by constructing keep-alive messages combined with operational data, transmitting such keep-alive messages to ground networks, and awaiting responses from the ground networks. Embodiments described herein provide inflight status information to the ground while providing a means to actively maintain a routing table based on keep-alive responses from the ground network and the users preferred service. Onboard aircraft router 104 may include the router shown and described in U.S. Pat. No. 9,553,658 to Bantoft, assigned to the same assignee as the subject patent application and incorporated by reference in its' entirety.

With continuing reference to FIG. 1, system 100 may also include celestial gateway equipment 106. Celestial gateway equipment 106 are preferably deployed as on wing equipment that provides a satellite transport mechanism for the bi-directional keep alive packets to pass to and from the ground network 102 via satellite 108 and earth stations 110 that bi-directionally receive and transmit satellite transmissions and connect such transmissions with a WAN (wide area network). Ku Band, Swift Broadband, and Ka Band are different types of satellite communication services that may be offered. Accordingly, celestial gateway equipment 106 preferably includes Ku Band 1062, Ka Band 1064, and/or Swift Broadband 1066 communication equipment.

System 100 may also include terrestrial gateway equipment 112. Terrestrial gateway equipment 112 refers to on-wing equipment that provides access to the cellular communications network 114 on the ground. Terrestrial gateway equipment 112 may include one or more ATG (Air to Ground) (e.g., a GoGo™ ATG) terminals 1122, which is a terminal that provides a transport mechanism for bi-directional keep alive packets to pass to and from the ground network 102 while in flight. Terrestrial gateway equipment 112 may also include one or more Airbourne Radios (ABR) (e.g., a SmartSky™ ABR) 1124, which is a terminal that provides a transport mechanism for bidirectional keep alive packets to pass to and from the ground network 102 while in flight. Terrestrial gateway equipment 112 may also include one or more 3G/LTE/5G (or more advanced) modems 1126, which are cellular modems (e.g., housed within the onboard direct router) that provide a transport mechanism for bi-directional keep alive packets to pass to and from the ground network 102 when the aircraft is on the ground.

With continuing reference to FIG. 1, the earth stations 110 and cellular networks 114 may connect to the ground network 102 via the Internet or other global computer network 118. Ground Network (Virtual Server Nodes) 102 (e.g., a Satcom Direct™ ground network) may include one or more network server nodes 1022. As part of the embodiments of a system 100 for combining network operational data and keep-alive packets, these network servers 1022 may perform three main functions. Network server nodes 1022 send an immediate keep-alive response to a requesting aircraft. Network server nodes 1022 process operational data retrieved from each request. Network server nodes 1022 store the operational data for access by other integrated applications and technical personnel. In an embodiment, a first virtual node 1022 sends an immediate keep-alive response to the requesting aircraft, a second virtual node 1022 processes the operational data retrieved from each combined keep-alive request transmission, and a third virtual node 1022 stores the data access by other integrated applications and technical personnel. Virtual nodes 1022 may be instantiated and run by a processor and memory (e.g., on a multiple computer blade server or similar system) including instructions therein that are executed by the processor for performing the operations, methods and processes described herein.

Figure 2:
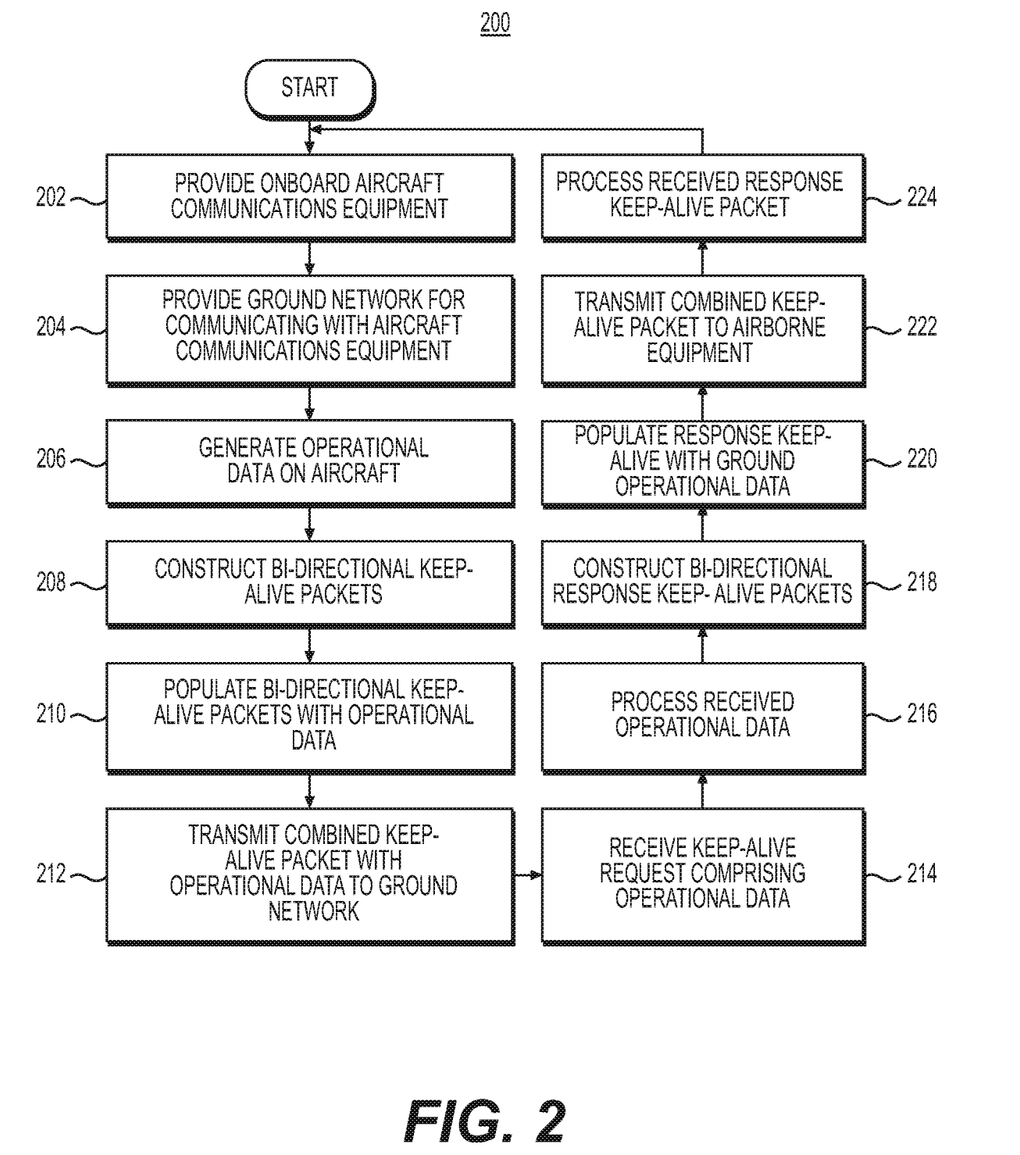
FIG. 2 is a flowchart illustrating an embodiment of a method for transmitting operation data within keep-alive packets.

With reference now to FIG. 2, shown is a flowchart illustrating an embodiment of a method 200 for combining network operational data and keep-alive packets. Method 200 includes providing onboard aircraft communication equipment for transmitting keep-alive packets to a ground network (block 202). The onboard aircraft communication equipment may include an onboard aircraft router and onboard gateway equipment described above. The provided 202 onboard aircraft communication equipment is deployed on an operational aircraft and transmits keep-alive packets to a ground network. Method 200 provides a ground network for communicating with an onboard aircraft router and onboard gateway equipment (block 204). The provided 204 ground network may be ground network 102 shown in FIG. 1 (e.g., a Satcom Direct ground network). Method 200 may generate operational data from the aircraft (block 206). Operational data may be generated 204 by standard operational equipment onboard the aircraft. Operational data may include, e.g., statistics about device health, connected device information, event data, and the like. As noted above, event data may be data related to the system itself, or a connected system, and may contain details of a specific event or series of events, like connection up/down, authentication success or failure, subsystem status changes, and similar data.

Method 200 may construct bi-directional keep-alive packets (block 208). Ordinarily, without the present invention, on-board aircraft router would simply transmit the keep-alive packets to the ground network to indicate aircraft was in the air and operational and requesting a response to confirm aircraft was identified and acknowledged by the ground network. Embodiments of method 200 for combining network operational data and keep-alive packets, however, provide substantially more information to the ground network. Client operating on aircraft, e.g., on onboard aircraft router, may combine the generated operational data with the keep-alive packets into a combined transmission (block 210). As is described above and in detail below, with reference to FIGS. 3A-3B, combining 210 the operational data and the keep-alive packets collapses layers 4–7, by taking the application layer data (i.e., the operational data), which is normally at OSI layers 6–7, and directly placing the application layer data into the payload of the keep-alive packets, which operate at OSI layer 4. Method 200 transmits the combined transmission (keep-alive packet combined with operational data) from the onboard gateway equipment and onboard aircraft router to the ground network (block 212). Method 200 may re-transmit (not shown in FIG. 2) if no response is received or periodically to the same or different ground networks as aircraft travels. Although no end to method 200 is shown in FIG. 2, method 200 may repeat continuously, e.g., while operating aircraft is airborne, or terminate, e.g., such as when aircraft lands.

Figure 3A:
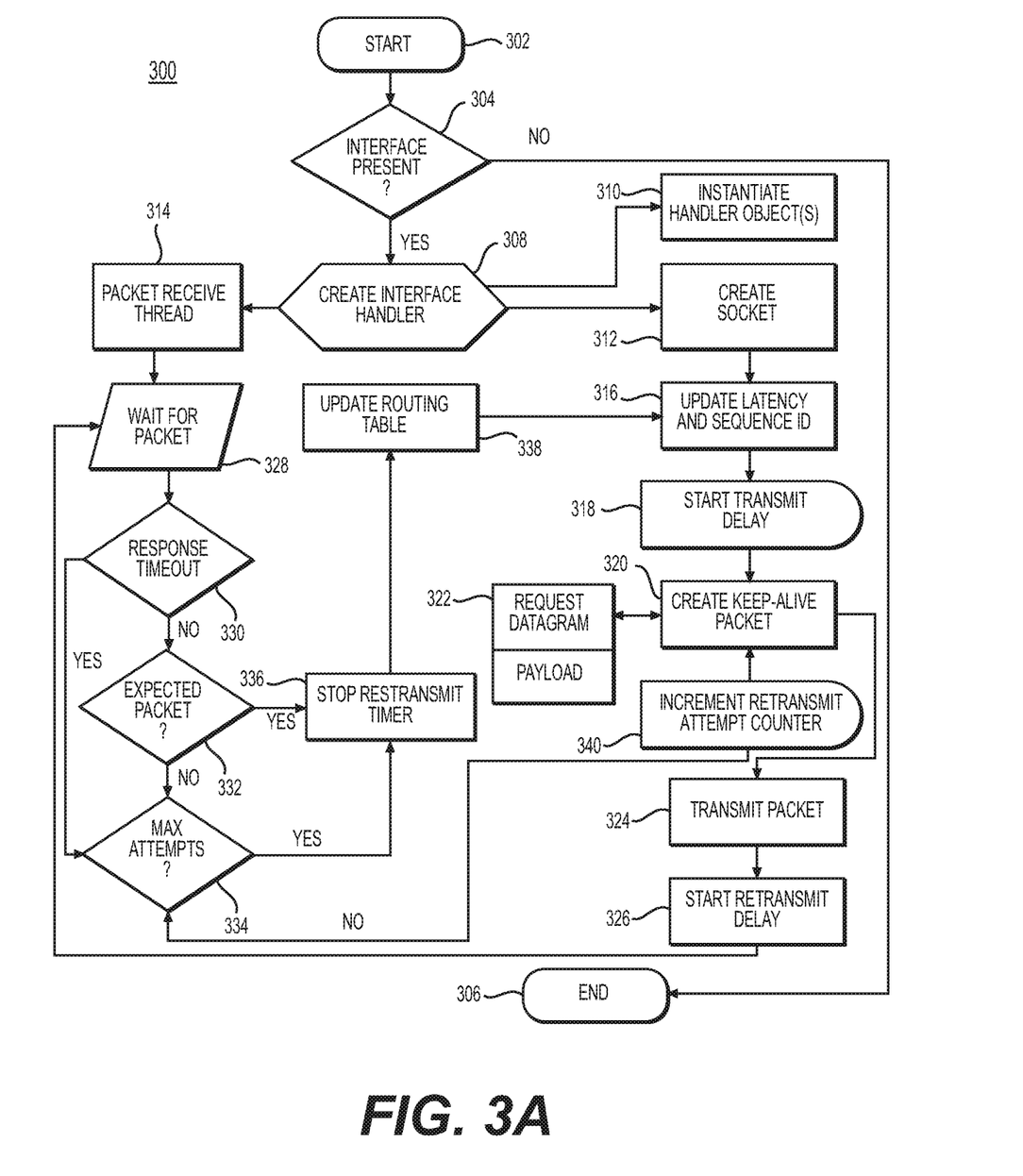
FIGS. 3A-3B are flowcharts an embodiment of a method for transmitting operation data within keep-alive packets, including operational and network checking steps between the onboard aircraft router and gateway equipment and the ground network of FIG. 1.
Figure 3B:
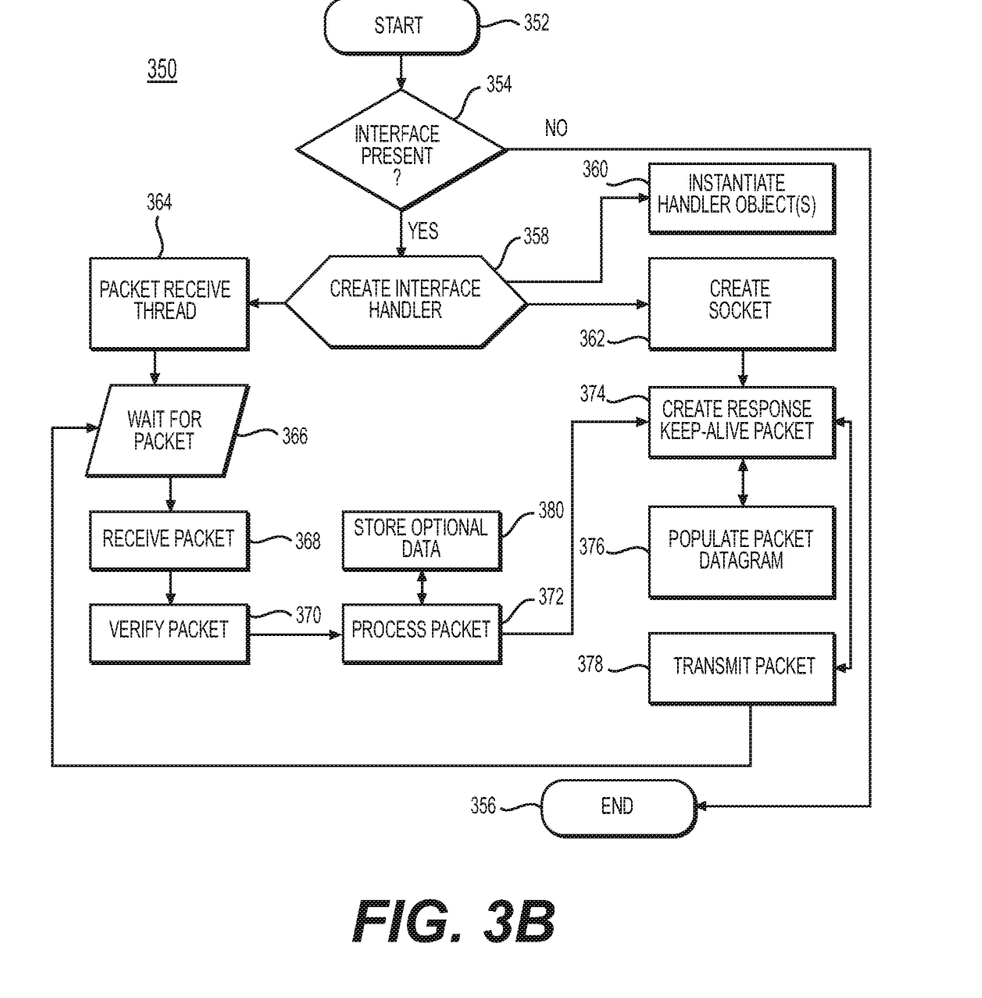

With reference now to FIGS. 3A-3B, shown are flowcharts of operational and network checking steps between the on-board router, gateway equipment, and the ground network (e.g., of system 100 of FIG. 1) performed during execution of method 200 for combining network operational data and keep-alive packet (e.g., FIG. 2). With reference to FIG. 3A, shown is an embodiment of a method 300 for combining network operational data and keep-alive packet from the on-board aircraft perspective. Functionally, the process 300 shown includes setting up a keep-alive session, making the transport level available of the keep-alive messages for operational data to be added to it. Processes on the system can provide operational data to a protocol handler to be transmitted, which will queue the data for the next transmission.

Embodiments of system 100 may include a software client operating on-board the aircraft (e.g., on onboard aircraft router). Method 300 may include, accordingly, startup of a client application (block 302). Client may next check if an associated network interface is present (block 304). The associated network interface is the network interface used by the onboard aircraft communication equipment for air to ground communication. If the associated interface is not present, there is no mechanism for communicating to the ground network and client may terminate (End) (block 306). If the associated network interface is present, client may prepare a bi-directional keep-alive handler (block 308). Keep-alive handler generates the transport layer, constructs the actual keep-alive packet, and combines the keep-alive packet with the operational data. There will be a handler object for each instance of the handler. Multiple instances of the handler may be created if client is communicating with multiple ground networks. Accordingly, handler may instantiate or create a bidirectional keep alive handler object for each instance of the handler needed (block 310).

With continuing reference to FIG. 3A, the keep-alive interface handler creates a socket (e.g., a TCP/IP socket) (block 312). The created 312 socket is a raw socket to be used for the Keep-Alive. In creating 312 the raw socket, handler may optionally set the socket's Differentiated Services Code Point (DSCP) to 46 for critical packet priority or another priority level if so configured. In embodiments the socket may be created and implemented with a unique, proprietary protocol specifically designed to handle populating the keep-alive packet with operational data, labeling the keep-alive packet with a sequential ID, and otherwise fulfill the features described in this application. The interface handler may start the socket's packet receive thread (block 314). Starting 314 the packet receive thread creates a process thread that will receive all response keep-alive packets sent from the ground network, to the created 312 Keep-Alive socket, in response to the combined keep-alive messages sent to the ground network by the client (see below).

When initially constructing keep-alive packets, client initializes a packet sequence identifier and initializes a packet latency to zero (block 316). The packet sequence identifier labels the keep-alive packets in sequential order so client can track each packet and the sequence of packets received. Latency is a timer that times and indicates the round-trip time (from air to ground network and back) of the keep-alive messages sent by client. When in operation, client updates 316 the latency and sequence identifier for each packet received. Client determines and tracks a transmit delay and the latency by starting an interface polling transmit timer (block 318).

Client creates or constructs the bi-directional keep-alive packet (which may be referred to as an air-to-ground (ATG) packet (e.g., a Satcom Direct ATG (SDATG)) that is populated with the operational data (block 320). In an embodiment, the bi-directional keep-alive packet that will be populated with operational data may be constructed 320 with an internet protocol (IP) header and a datagram (a ATG Datagram) with the format shown below:

| IP Header | ATG Datagram | |
|---|---|---|

In embodiments, the ATG datagram is populated with and includes the operational data and other information. For example, the operational data may include interface information, statistical information, event data and the like, as described above. Additional information included in the ATG datagram may include a message ID (e.g., a number identifying the keep-alive message), a checksum, a data length indicator, a sequence ID (e.g., the number described above identifying the sequential order of the keep-alive message), a product indicating the model and/or serial number of the device constructing the keep-alive packet, or other unique identifier, identified failures if the system has detected a failure or one or more communication links, and latency. Consequently, creating 320 the bi-directional keep-alive packet may include requesting the datagram payload (block 322) and populating the datagram payload with operational data and other information (e.g., interface information and statistical information).

The operational data is application layer data (layers 6-7 in the OSI model). Consequently, populating the transport layer (layer 4 in OSI model) keep-alive packet datagram with the operational data inserts application layer data into the transport layer. This in effect collapses layers 6-7 into layer 4.

With continuing reference to FIG. 3A, client may transmit the bi-directional keep-alive packet (with operational data) to a directed ground location (block 324). Transmitting 324 transmits the bi-directional keep-alive packet with operational data to a ground network requesting a keep-alive. Client may start a re-transmit delay by setting a timer for packet retransmission (block 326). Timer is set to amount of time client will wait for a response from ground network before re-transmitting 324 bi-directional keep-alive packet (with operational data). While re-transmit delay is pending, method 300 waits for response keep-alive packet (block 328). Client may determine if a response timeout (i.e., re-transmit timer has expired) has been reached (i.e., re-transmit (block 330). If re-transmit timer has expired indicating response timeout, method 300 may proceed to determine if a set maximum number of attempts has been reached (as determined by a re-transmit attempt counter) (block 334). If a response timeout has not occurred, method 300 may determine if the response keep-alive packet has been received (block 332). If the keep-alive response has been received, method 300 may stop the re-transmit timer (block 336) and process the packet (blocks 338 and 316). Updating 338 the routing table based on response results processes the received response packet. Updating 316 increments the sequence ID counter and calculates the latency of the received keep-alive response packet. Method 300 then restart the keep-alive polling process as described herein.

If a received packet is not the expected response keep-alive packet, method 300 may discard the received packet and determine 334 if the set maximum number of attempts has been reached. If the maximum attempts has been reached, a packet response timeout has occurred. Method 300 stops 336 the re-transmit timer, update the routing table (block 338), update 316 the latency and sequence ID, re-start 318 the transmit delay time (the keep-alive poll timer to track latency), re-construct 320 a keep-alive packet with operational data, transmit 322 the keep-alive packet and re-start 324 the re-transmit delay timer.

If the maximum number of attempts has not been reached, method 300 may increment the re-transmit attempt counter (block 340), re-transmit (block 322) the keep alive packet, and re-start 324 the re-transmit delay timer. Method 300 may continue the process as shown in FIG. 3A.

With reference to FIG. 3B, shown is an embodiment of a method 350 for combining network operational data and keep-alive packet from the ground network perspective. Method 350 illustrated in FIG. 3B may be implemented on ground network servers (e.g., network server nodes 1022). The ground side is functionally the inverse of the onboard airborne side, in that once initialized, it listens for messages, decodes them, relays the operational data on to one or more affiliated systems, and replies back to the onboard airborne system.

Accordingly, method 350 may include, startup of a server application (block 352). Server application may check if to determine if an associated Ethernet (or other) network interface is present (block 354). If an associated network interface is not present, server may have no mechanism for communicating with onboard airborne side and may terminate (End) the server program (block 356). If associated network interface is present, server application may prepare bi-directional keep alive handler (block 358). There will be an handler object for each instance of the handler. Multiple instances of the handler may be created if server is communicating with multiple onboard airborne clients; this is a typical scenario as ground networks typically communicate with multiple aircraft. Accordingly, handler may instantiate or create multiple bi-directional keep alive handler objects, one for each instance of the handler (block 360).

With continuing reference to FIG. 3B, bi-directional keep alive handler object may create a raw socket for Keep-Alive packets to be received and re-sent (block 362). Optionally, server may set the sockets DSCP to 46 for critical packet priority routing if so configured. In embodiments the socket may be created and implemented with the unique, proprietary protocol described above with the onboard airborne system. Server may also create a process thread that will receive all packets sent to the created socket from the onboard airborne client (block 364). Server may wait for keep-alive packet from onboard airborne client (block 366). Server may wait 366 indefinitely for a transmitted keep alive request packet. Upon receipt of keep-alive packet from onboard airborne client (block 368), server may verify the received packets checksum and contents (block 370).

Once verified, server may process the keep-alive packet to retrieve the operational data contained in the datagram and communicate the operational data to affiliated systems (block 372). Server may construct a bi-directional keep alive response packet (block 374). The response packet may be constructed in the same form and format as the received keep-alive packet sent by the onboard airborne client. Constructing 374 may include populating the datagram response payload with ground network operational data, including interface information and statistical information (block 376). The response packet may also be populated with the same packet ID and sequential ID as the received bi-directional keep alive packet. This allows the onboard airborne client to track the response and confirm it is the expected response keep-alive packet. Once constructed 374 and populated 376, server may transmit the keep-alive response packet back to the requesting node (onboard airborne client) (block 378). Server may store the operational data received from the keep-alive packets. Consequently, server may update a database with the received keep-alive request packet operational data (block 380) and proceed to wait 366 for next packet.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of combining operational data transmission and keep-alive packets, comprising:
   providing an onboard aircraft communication equipment, wherein the onboard aircraft communication equipment is deployed on an operational aircraft and transmits keep-alive packets to a ground network;
   generating operational data from the aircraft, wherein the operational data is application layer data;
   constructing a bi-directional keep-alive packet with keep-alive data for transmission between the onboard aircraft communication equipment and the ground network, wherein the keep-alive data is transport layer data;
   combining the operational data with the bi-directional keep-alive packet into a combined keep-alive request transmission, wherein the operational data and the keep-alive data are placed into a single open system interconnection (OSI) layer in the combined keep-alive request transmission; and
   transmitting the combined keep-alive request transmission from the onboard aircraft communication equipment to the ground network.

2. The method of claim 1 wherein the operational data includes statistics about device health, connected device information, and event data.

3. The method of claim 1 wherein the combining combines the application layer operational data into the transport layer data of the keep-alive packets.

4. The method of claim 1 wherein the keep-alive packet is a ping-type packet which expects a reply back within predetermined amount of time to indicate network connections that will pass traffic bi-directionally.

5. The method of claim 1 further comprising determining current run state of all celestial and terrestrial WAN interfaces on the operational aircraft and including the run states in the operational data.

6. The method of claim 1 wherein the onboard aircraft communication equipment comprises an onboard aircraft router and onboard gateway equipment.

7. The method of claim 6 wherein the onboard gateway equipment includes terrestrial gateway equipment and radio access.

8. The method of claim 6 wherein the onboard gateway equipment includes celestial gateway equipment and terrestrial gateway equipment and radio access.

9. The method of claim 1 further comprising providing a ground network for communicating with onboard aircraft communication equipment.

10. The method of claim 9 wherein the ground network includes:
    a first virtual node to send an immediate keep alive response to the requesting aircraft;
    a second virtual node to process the operational data retrieved from each request; and
    a third virtual node to store the data access by other integrated applications and technical personnel.

11. The method of claim 1 wherein the constructing a bi-directional keep-alive packet includes populating the bi-directional keep-alive packet with a packet ID and a sequential ID.

12. The method of claim 1 wherein the constructing a bi-directional keep-alive packet includes:
    creating an interface handler;
    instantiating an interface handler object for each instance of a bi-directional keep-alive packet to be constructed;
    creating a keep-alive socket; and
    constructing a datagram.

13. The method of claim 12 wherein the combining includes populating the datagram with the operational data.

14. The method of claim 1 further comprising:
    receiving the combined keep-alive request transmission at the ground network;
    processing the operation data in the keep-alive request transmission;
    constructing a bi-directional keep-alive response packet;

combining ground network operational data with the bi-directional keep-alive response packet into a combined keep-alive response transmission; and transmitting the combined keep-alive response transmission from the ground network to the onboard aircraft communication equipment.

15. The method of claim 14 further comprising waiting for a keep-alive request transmission at the ground network.

16. The method of claim 14 wherein the constructing a bi-directional keep-alive response packet includes populating the bi-directional keep-alive response packet with a packet ID that matches a packet ID of the combined keep-alive request transmission.

17. A system for combining operational data transmission and keep-alive packets, comprising:

onboard aircraft communication equipment, wherein:

the onboard aircraft communication equipment is deployed on an operational aircraft and transmits keep-alive packets to a ground network, and the onboard aircraft communication equipment includes onboard gateway equipment and an onboard aircraft router, wherein the onboard aircraft router includes a processor and a memory, the memory including instructions for execution by the processor to:

generate operational data from the aircraft, wherein the operational data is application layer data;

construct a bi-directional keep-alive packet with keep-alive data for transmission between the onboard aircraft communication equipment and the ground network, wherein the keep-alive data is transport layer data;

combine the operational data with the bi-directional keep-alive packet into a combined keep-alive request transmission, such that the operational data and keep-alive data are placed into a single open system interconnection (OSI) layer in the combined keep-alive request transmission; and transmit the combined keep-alive request transmission from the onboard aircraft communication equipment to a ground network.

18. The system of claim 17 further comprising a ground network for receiving the combined keep-alive request transmission, wherein the ground network includes:

a first virtual node to send an immediate keep-alive response to the requesting aircraft;

a second virtual node to process the operational data retrieved from each combined keep-alive request transmission; and a third virtual node to store the data access by other integrated applications and technical personnel.

19. The system of claim 18 wherein the first virtual node is instantiated by a processor and a memory, wherein the memory includes instructions executed by the processor to:

receive the combined keep-alive request transmission at the ground network;

construct a bi-directional keep-alive response packet;

combine ground network operational data with the bi-directional keep-alive response packet into a combined keep-alive response transmission; and transmit the combined keep-alive response transmission from the ground network to the onboard aircraft communication equipment.

20. The system of claim 18 wherein the second virtual node is instantiated by a processor and a memory, wherein the memory includes instructions executed by the processor to process the operation data in the keep-alive request transmission.

* * * * *